United States Patent [19]

Bethell

[11] Patent Number: 5,104,144
[45] Date of Patent: Apr. 14, 1992

[54] SHOCK ABSORBER WITH SONAR POSITION SENSOR

[75] Inventor: Michael R. Bethell, Monroe, Mich.

[73] Assignee: Monroe Auto Equipment Company, Monroe, Mich.

[21] Appl. No.: 587,981

[22] Filed: Sep. 25, 1990

[51] Int. Cl.⁵ .............................................. B60G 11/26
[52] U.S. Cl. .................................................... 280/707
[58] Field of Search ................................ 280/707, 702

[56] References Cited

U.S. PATENT DOCUMENTS

| | | | |
|---|---|---|---|
| 4,090,407 | 5/1978 | Schuler et al. | 73/290 V |
| 4,550,286 | 10/1985 | Holland et al. | 280/707 X |
| 4,595,072 | 6/1986 | Barnea | 280/707 X |
| 4,650,042 | 3/1987 | Knecht et al. | 280/707 X |
| 4,674,768 | 6/1987 | Morra | 280/707 |
| 4,722,547 | 2/1988 | Kishi et al. | 280/707 |
| 4,883,150 | 11/1989 | Arai | 280/DIG. 1 X |
| 4,995,635 | 2/1991 | Guy | 280/707 |
| 5,000,478 | 3/1991 | Kerastas | 280/707 |

FOREIGN PATENT DOCUMENTS

7028174 6/1987 Fed. Rep. of Germany.
2177475A 1/1987 United Kingdom.

Primary Examiner—Charles A. Marmor
Assistant Examiner—Kevin Hurley
Attorney, Agent, or Firm—Harness, Dickey & Pierce

[57] ABSTRACT

A damping device operable to change a suspension characteristic of a vehicle in response to changes in a relative relationship between the piston and the cylinder of the damping device. The damping device comprising a pressure cylinder forming a working chamber operable to store damping fluid. A piston is disposed within the pressure cylinder defining an upper and lower portion of the working chamber. The damping device further comprises a transducer for emitting and receiving sound waves within the lower portion of the working chamber. The sound waves emitted by said transducer are reflected by the end surface of the cylinder or a base valve mounted at the end of the cylinder and are received by said transducer. A timing circuit determines the difference in time between the emitted and reflected sound waves and generates an output in response thereto. A central processor calculates the desired relative relationship, such as the relative distance between the piston and the base valve, from the output of the timing circuit.

27 Claims, 4 Drawing Sheets

SHOCK ABSORBER WITH SONAR POSITION SENSOR

BACKGROUND OF THE INVENTION

1. Field of the Invention

This invention relates to vehicle suspension systems, and more particularly to a method and apparatus for selectively modifying a suspension parameter in response to changes in the relative orientation between telescopically movable components of a hydraulic damping device.

2. Description of Related Art

To provide means for selectively adjusting a suspension parameter or for controlling variable leveling requirements, information regarding the relative motion of the suspension and/or the vehicle body is required. Such information is commonly supplied by sensors to a central electronic controller for measuring and calculating suspension and body displacement, velocity and acceleration. This information is used by the electronic controller to selectively control the suspension characteristics of the vehicle to provide the desired response.

Damping devices ("dampers") are used in conjunction with automotive suspension systems to absorb unwanted vibration (impacts, loads, etc.) which occurs during driving. To absorb this unwanted vibration, dampers are generally connected between the body and the suspension of the automobile. A piston is located within the damper and is connected to the body of the automobile through a piston rod. Because the piston valving and orifices act to restrict the flow of damping fluid within the working chamber of the damper when the damper is compressed, the damper is able to produce a damping force which counteracts the motion of the wheel and/or body which would otherwise remain undamped. The greater the degree to which the flow of damping fluid within the working chamber is restricted by the piston, the greater the damping forces which are generated by the damper.

In selecting the amount of damping that a damper is to provide, three vehicle performance characteristics are often considered: ride comfort, vehicle handling and road holding ability. Ride comfort is often a function of the spring constant of the main suspension springs of the vehicle, as well as the spring constant of the seat, tires, and the damper. Vehicle handling is related, among other things, to variation in the vehicle's attitude (i.e., roll, pitch and yaw). For optimum vehicle handling and, consequently, superior body and wheel control, relatively large damping forces are required to avoid excessively rapid variation in the vehicle's attitude during cornering, acceleration, and deceleration. Road holding ability is generally a function of the amount of variation in the normal load between the tires and the ground. To optimize road holding ability, larger damping forces are required when driving on irregular surfaces to minimize the normal load variations so as to prevent complete loss of contact between the wheels and the ground.

To optimize ride comfort, vehicle handling, and road holding ability, it is generally desirable to have the damping forces generated by the damper be responsive to the frequency of the input from the road or from the body. When the input frequency is approximately equal to a natural frequency of the body (e.g., approximately between 1-2 Hz), it is generally desirable to have the damper provide relatively large damping forces (relative to critical damping) to avoid excessively rapid variation of the vehicle's attitude during cornering, acceleration and deceleration. When the input frequency is between 2-10 Hz (mostly from the road), it is generally desirable to have the damper provide low damping levels so as to produce a smooth ride and allow the wheels to follow changes in road elevation. When the input frequency from the road is approximately equal to the natural frequency of the automobile suspension (i.e., approximately 10-15 Hz), it is desirable on one hand to have relatively low damping forces to provide a smooth ride, and on the other hand provide high damping forces so as to minimize variation in tire normal load and prevent complete loss of contact between the wheels and the ground.

Selective control of a desired suspension parameter often requires information regarding the movement of the piston within the pressure cylinder of the damper. This information not only identifies whether the damper is in compression or extension, but also can provide information concerning the magnitude and frequency of suspension motion.

Several methods are known for obtaining information regarding the movement of the piston within the pressure cylinder. PCT Application No. PCT/US87/00615 uses a pressure sensor as well as an accelerometer to determine whether the damper is in compression or extension, as well as to obtain information regarding the road surface. U.K. patent application No. GB 2 177 475A and West German patent No. G 87 02 817.4 disclose suspension damping devices incorporating ultrasonic "sonar" wave systems for determining positional displacement information. The positional displacement information is obtained by determining the time from transmission of an ultrasonic wave to when its reflected "echo" wave is received. Both references use a single transducer acting to emit and receive the pulsed ultrasonic waves. Use of a single transducer necessitates incorporation of costly ultrasonic wave modulation and calibration circuitry to ensure coherent wave detection. Additionally, the transducers in both references are mounted such that the piston acts to reflect the ultrasonic waves.

SUMMARY OF THE INVENTION

Accordingly, it is a primary object of the present invention to provide a method for sensing and calculating a desired relationship between the telescopically movable components of a hydraulic actuator ("damper") and a stationary component so as to permit selective control over the damping, motion and/or forces generated by the actuator. The relationship calculated can relate to any useful form such as displacement, velocity, and acceleration.

Another primary object of the present invention is to provide a hydraulic damper or actuator capable of selectively changing a suspension parameter which incorporates a method for calculating the distance and/or change in distance between a telescopically movable piston and a stationary reflector within a pressure cylinder using ultrasonic sound waves.

Another object of the present invention is to provide a method and apparatus for generating continuous real-time electrical signals for selectively controlling suspension characteristics with the hydraulic actuator which is responsive to the input frequencies of the road.

It is a further object of the present invention to provide a method and apparatus for selectively controlling suspension characteristics of a vehicle in response to changes in the position of the piston relative to the base valve using a sonar, preferably within the ultrasonic spectrum, which is responsive to the relative motion of the sprung and unsprung portions of a vehicle.

A further object of the present invention is to provide a direct acting, telescopic, hydraulic shock absorber having a high degree of flexibility with respect to vehicular applications. In this regard, a related object of the present invention is to provide a hydraulic actuator which is relatively low in cost and relatively easy to maintain.

According to the preferred embodiment of the present invention, the hydraulic actuator comprises a direct acting hydraulic damper, such as a shock absorber, having transducer means for emitting and receiving sound waves. The transducer means is mounted to the lower surface of the piston which is coaxially disposed within the pressure cylinder of the shock absorber. Electrical leads passing through the piston rod and piston connect the transducer to signal generating and processing circuitry. The electrical lead wires extending out of the piston rod are attached to a non-moving component relative to the body. This is an advantage over the prior art sonar systems which attach the lead wires to a moving part of the body.

According to the method of the present invention, a wave generating circuit excites a transducer device so as to produce a constant frequency ultrasonic wave. The transducer emits ultrasonic waves of a predefined frequency and duration through the damping fluid medium located between the lower surface or the piston and the base valve disposed at the lower end of the pressure cylinder. The emitted ultrasonic waves are reflected by an end wall or a base valve at the bottom of the cylinder so as to propagate back to the transducer through the damping fluid. The transducer device electrically communicates with a signal processing circuit which calculates the time of propagation from the time the wave is emitted until it is received. Additionally, the present invention includes compensation means for adjusting for changes in the speed of wave propagation due to fluid viscosity variations.

By measuring the time difference between the emitted ultrasonic waves and the reflected ultrasonic waves, the distance of the piston relative to the base valve or the end surface can be calculated by using a computer. Accordingly, a continuous determination can therefore be generated which, as an example, can be used by a piston control circuit to control the damping forces of the shock absorber. Such determination can also be employed to detect the polarity (direction) of motion of the piston.

While the preferred embodiment discloses a twin-tube shock absorber, it is contemplated that the principles embodied in the present invention are readily adapted to mono-tube devices and other hydraulic or pneumatic actuators having vehicular application.

BRIEF DESCRIPTION OF THE DRAWINGS

Various advantages of the present invention will become apparent to one skilled in the art upon reading the following specification and by reference to the following drawings in which:

FIG. 6 is a schematic representation illustrating the electrical circuits used for selectively changing the desired suspension characteristics of the damper.

DESCRIPTION OF THE PREFERRED EMBODIMENT

Figure 1:
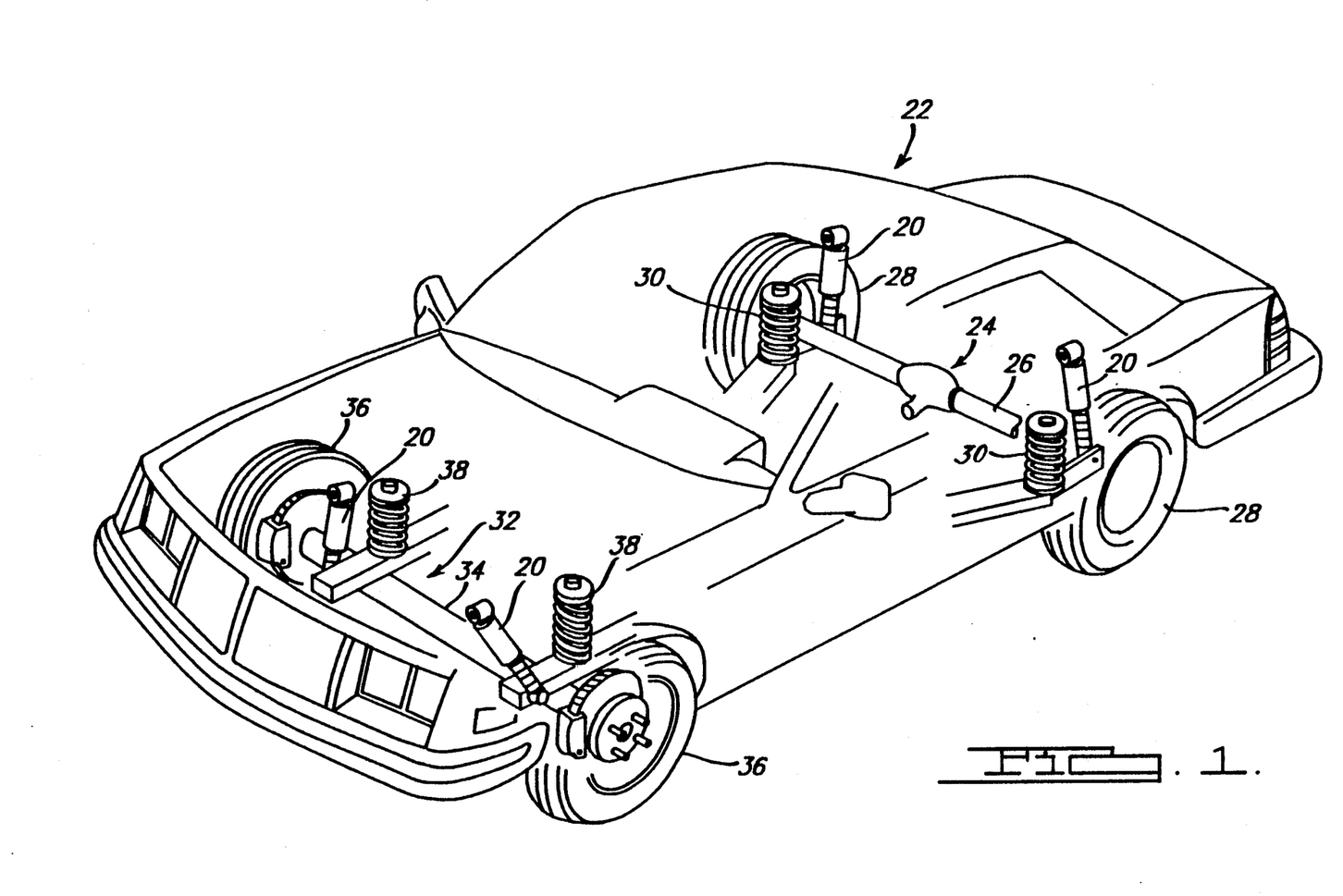
FIG. 1 is a diagrammatic representation of the direct acting hydraulic dampers according to the preferred embodiment of the present invention shown in operative association with a typical automobile.

Referring to FIG. 1, a plurality of four hydraulic actuators defined as dampers 20 in accordance with the preferred embodiment of the present invention are shown. The dampers 20 are depicted in operative association with a diagrammatic representation of a conventional automobile 22. The automobile 22 includes a rear suspension 24 having a transversely extending rear wheel assembly 26 adapted to support the rear wheels 28 of the automobile 22. The wheel assembly 26 is operably connected to the automobile 22 by means of a pair of dampers 20 as well as by the helical coil springs 30. Similarly, the automobile 22 has a front suspension system 32 including a transversely extending front wheel assembly 34 to support the front wheels 36. The front wheel assembly 34 is connected to the automobile 22 by means of a second pair of dampers 20 and by the helical coil springs 38. While the preferred embodiment is described with use of coil springs, it is to be understood that any other load-carrying device (leaf springs, air springs, hydro-pneumatic springs, etc.) are within the scope and fair meaning of the present invention. The dampers 20 serve to damp the relative movement of the unsprung portions (i.e., the front and rear suspensions 32 and 24) and the sprung portion (i.e., the body 39) of the automobile 22. While the automobile 22 has been depicted as a passenger car, the damper 20 may be used with other types of motor vehicles as well.

Figure 2:
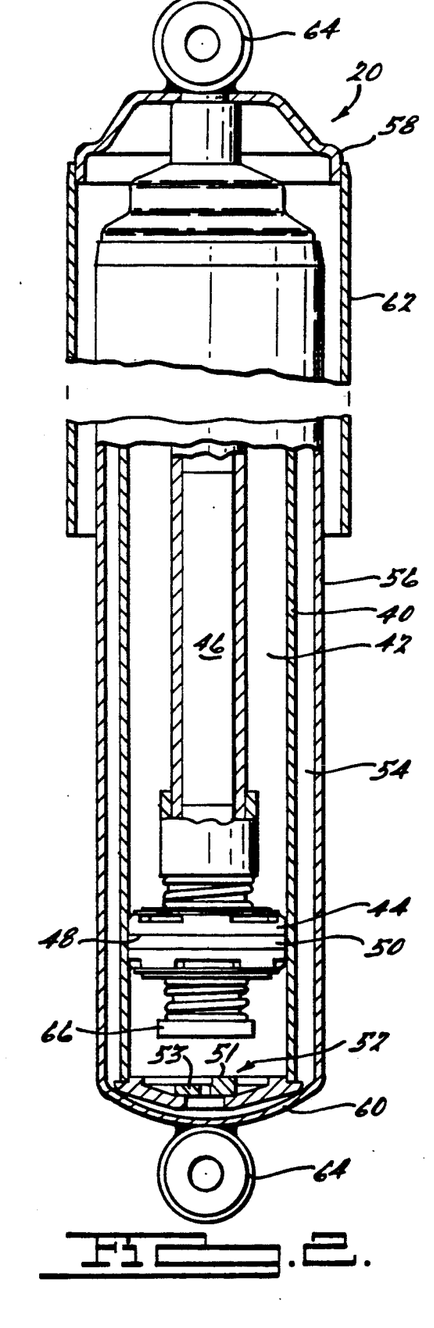
FIG. 2 is an enlarged side elevational view, partially broken away, of the direct acting hydraulic damper shown in FIG. 1 according to the preferred embodiment of the present invention.

With particular reference to FIG. 2, the damper 20 according to a preferred embodiment of the present invention is shown. The damper 20 comprises an elongated tubular pressure cylinder 40 defining a damping fluid containing working chamber 42. Disposed within the working chamber 42 is a reciprocable piston 44 that is secured to one end of an axially extending piston rod 46. The piston 44 includes a circumferential groove 48 operable to retain a piston ring 50 as is well known in the art. The piston ring 50 is used to prevent damping fluid from flowing between the outer periphery of the piston 44 and the inner diameter of the cylinder 40 during movement of the piston 44. A base valve, generally designated by the numeral 52, is located within the lower end of the pressure cylinder 40 and is used to control the flow of damping fluid between the working chamber 42 and an annular fluid reservoir 54. The annular fluid reservoir 54 is defined as the space between the outer periphery of the cylinder 40 and the inner periphery of a reservoir tube of cylinder 56 which is arranged centrally around the exterior of the pressure cylinder 40. The operation of the base valve 52 may be of the type shown and described in U.S. Pat. No. 3,771,626 which is hereby incorporated by reference. Additionally, the base valve 52 has a step-like upper geometry defining a first surface 51 and a second surface 53 to be detailed hereinafter. It is contemplated, however, that the present invention is applicable to hydraulic actuator operable without base valves, check valve or the like.

The upper and lower ends of damper 20 are provided with generally cup-shape upper and lower end caps 58 and 60 respectively. The end caps 58 and 60 are secured to opposing ends of the reservoir tube 56 by a suitable means such as welding. The damper 20 is shown as being provided with a dirt shield 62 which is secured at its upper end to the upper end of the piston rod 46. Suitable end fittings 64 are secured to the upper end of the piston rod 46 and the lower end cap 60 for securing the damper 20 between the body and the wheel assembly of the automobile 22. Those skilled in the art will appreciate that, upon reciprocal movement of the piston 44, damping fluid within the pressured cylinder 40 is transferred between the upper and lower portions of the working chamber 42, and between the working chamber 42 and the fluid reservoir 54. By controlling the flow of damping fluid between the upper and lower portions of the working chamber 42, the damper 20 is able to controllably dampen relative movement between the body and the wheel of the automobile 22 so as to optimize both ride comfort and road handling ability.

The piston 44 is provided with a valve arrangement (not shown) for controllably metering the flow of damping fluid between the upper and lower portions of the working chamber 42 during reciprocal movement thereof. One such valve arrangement is disclosed in PCT Application No. PCT/US87/00615 which is hereby incorporated by reference. It is contemplated, however, that the present invention may be used with other suitable valve arrangements as well as other suitable damping devices. It is to be understood that the afore-described structure of damper 20 is merely exemplary and that the principles of the present invention are applicable to numerous actuator designs.

Figure 3:
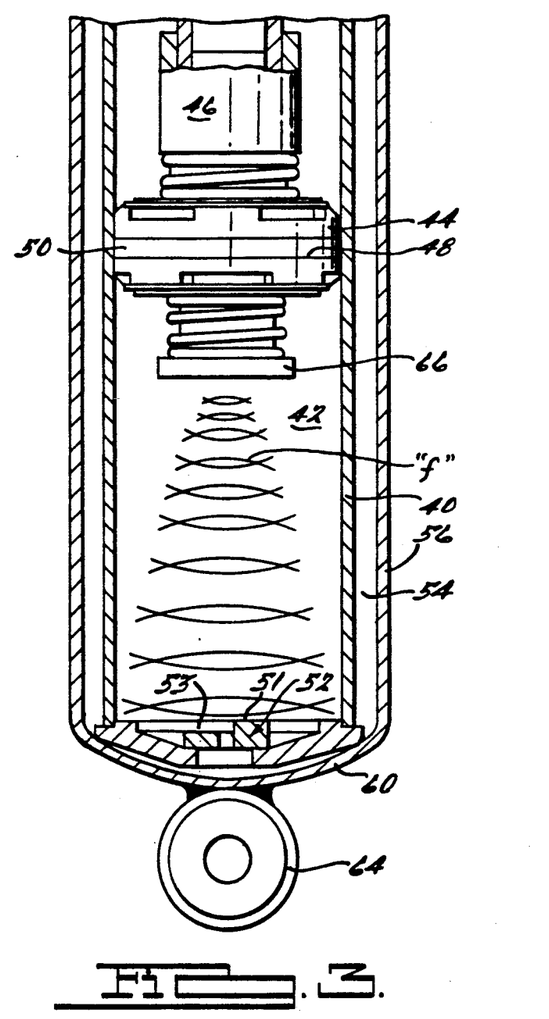
FIG. 3 is an enlarged cross-sectional view of FIG. 2 illustrating the relative location and operation of the ultrasonic transducer device shown in FIG. 2 according to the preferred embodiment of the present invention.

In accordance with the principles of the present invention, the damper 20 further comprises an acoustical transducer 66 acting as a transmitter/receiver which is secured to a surface of the piston 44 opposite rod 46. The transducer 66 is used to generate ultrasonic waves having a predetermined frequency "f" in the direction of the end wall of cylinder 40 facing transducer 66 to which base valve 52 is secured. Ultrasonics is the name given to sound waves having a frequency higher than to those which the human ear can respond (approximately 16 KHz). The propagation of sound waves through a relatively non-absorptive medium involves the generation of vibrations in the elementary particles of the medium through which the waves are passing. While the transmitter 66 may be piezoelectric device fabricated from quartz, Barium Titanate or lead Zirconate Titanate or a magnetoresistrictive device, other suitable devices may be used. The resonant frequency "f" selected is related to the dimensions of the piezoelectric transducer selected. When the ultrasonic waves emitted by the transducer 66 encounter the base valve 52, they are reflected in a direction back toward the transducer 66. The transducer 66 receives the ultrasonic "reflected" waves which are reflected by the base valve 52 and generates an output in response thereto. For purposes of the following discussion, the ultrasonic waves generated by transducer 66 will be referred to as the "emitted waves", while the waves received by transducer 66 will be referred to as the "reflected waves".

Base valve 52 is provided with a first stepped surface 51 disposed axially above a second stepped surface 53 perpendicular to the cylindrical axis of cylinder 40 by a predefined distance. The predefined axial displacement of surfaces 51 and 53 provide means for compensating for changes in the speed of wave propagation through the damping fluid due to the temperature and pressure effects on viscosity. The stepped surfaces 51 and 53 produce separate reflected waves, the trailing wave referred to as the "echo wave", both of which are received by transducer 66. The echo wave lags behind the reflected wave. While commonly used damping fluids have sufficiently low attenuation properties up to about 3 MHz, compensation means are still preferably used. The predetermined distance between surfaces 51 and 53 thereby provide a known reference distance. The relationship between the predefined axial distance and the echo wave permits adjustments for viscosity changes.

When the piston 44 is stationary relative to the base valve 52, the time for the reflected ultrasonic waves to reach the transducer 66 will be constant. However, when the piston 44 is moving in a direction toward the cylinder end to which base valve 52 is secured, the time between transmission and receipt of the reflected sound wave will be shorter. In contrast, when the piston 44 is moving in a direction away from the base valve 52, the time for the reflected ultrasonic wave to reach the transducer 66 will be longer. By continuous, repetitive measurement of such time differences, the displacement or distance of the piston 44 relative to base valve 52 can be determined. Such information can, in turn, be used to determine related data such as velocity, acceleration, body frequency and jerk.

Figure 5:
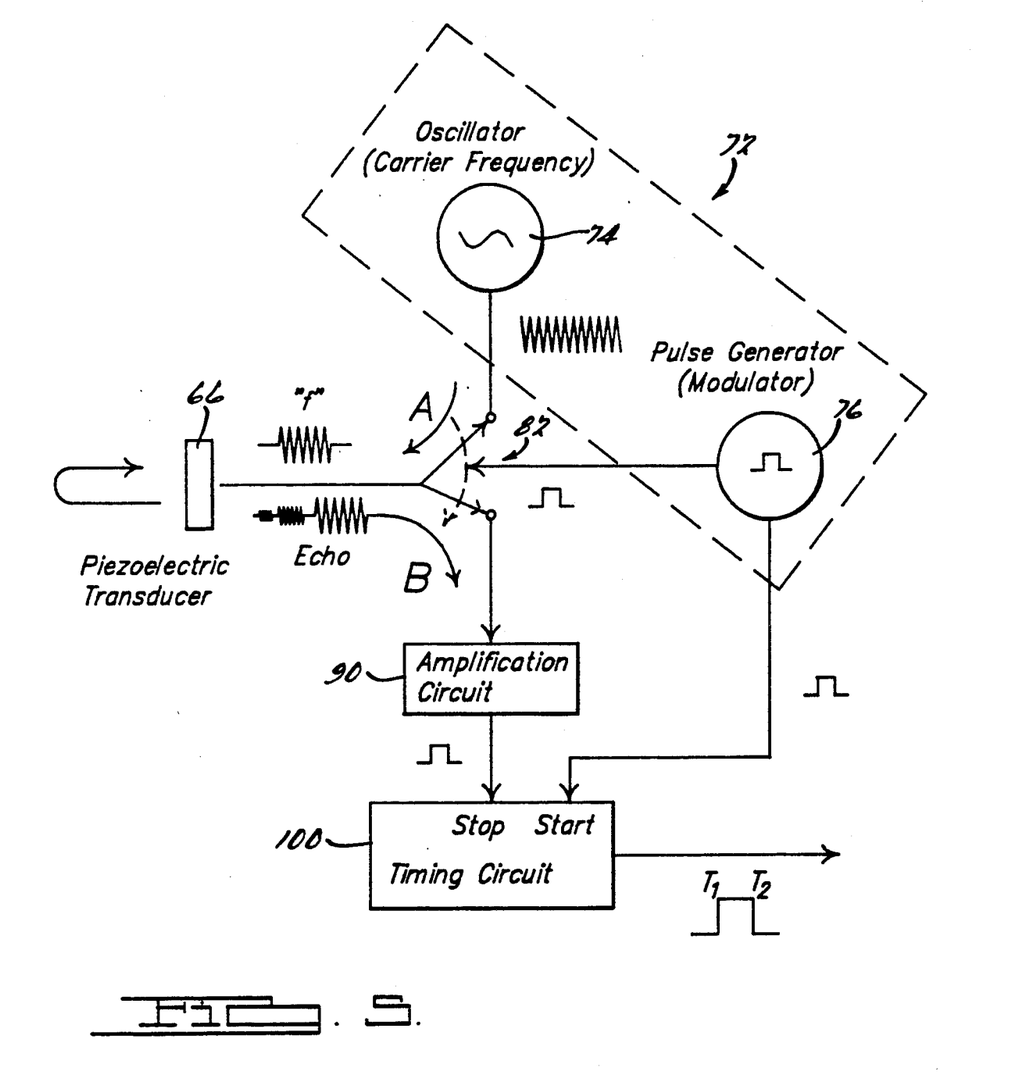
FIG. 5 is a block diagram illustrating the electrical components which are used for driving the transducer shown in FIG. 2.

In operation, the preferably wave control system employed is the pulse-echo method. This method involves the transmission of a pulsed acoustic wave followed by determination of the time taken for the first echo from the reflection at the base valve 52 to return to transducer 66. FIG. 5 shows a block diagram illustrating this control method. The carrier or resonant frequency "f" is chosen according to the mechanical characteristics of the transducer 66 and of the damping fluid.

Figure 4:
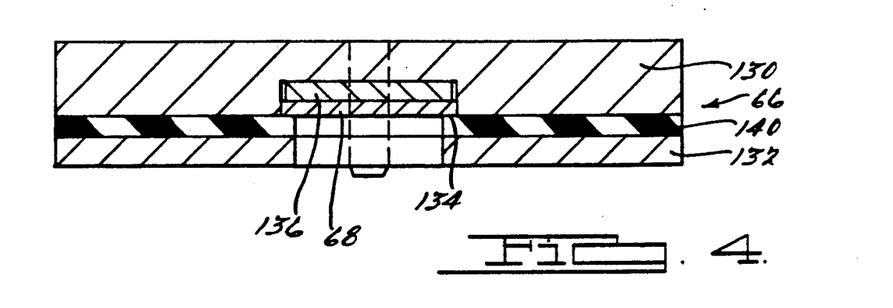
FIG. 4 is an enlarged cross-sectional view of the transducer mounting assembly according to the preferred embodiment.

When the piezoelectric crystal 68 of the transducer 66 is excited by a sinusoidal voltage input, a finite time is required for it to reach an equilibrium state. Similarly, a finite time is taken for the crystal 68 to stop vibrating once the electrical excitation has been removed. In order to use a single transducer 66 to emit and receive the ultrasonic sound waves, the crystal 68 must be capable of attenuating its oscillation after transmission of the pulse "f" in order to prevent overlap of the transmitted and echo pulses. Consequently, the transducer should have a small modulation pulse width thereby permitting operation when there is a minimum distance between the transducer 66 and base valve 52. The control strategy is also able to discriminate between a first reflected wave and subsequent reflected waves due to the time between transmitted pulses being set longer than the acoustical damping time of the fluid.

To provide means for driving the transducer 66, a wave generating circuit 72 is provided. The wave generating circuit 72 is electrically connected to the transducer 66 so as to enable the transducer 66 to produce emitted ultrasonic waves of a predetermined carrier frequency "f". Preferably, the wave generating circuit 72 causes the emitted ultrasonic waves generated by the transducer 66 to be of continuous form so as to enable efficient, continuous, real-time determinations of the relative distance between the piston 44 and the base valve 52. The wave generating circuit 72 comprises an oscillator 74, and a pulse generator or modulator 76. It is contemplated that other types of wave generating circuits known in the art may be readily substituted heretofore.

To provide means for detecting the reception of the reflected wave or pulse by transducer 66, an amplification circuit 90 is provided. Amplification circuit 90 is electrically connected to transducer 66 so as to amplify the reflected signal and determine the largest peak amplitude thereof.

To provide means for measuring the time difference between the reflected ultrasonic waves and the emitted ultrasonic waves, the shock absorber 20 further comprises a timing circuit 100. As shown in FIGS. 5 and 6, the timing circuit 100 receives a signal from the wave generating circuit 72 to "start" the timing circuit 100. Timing circuit 100 further receives a signal from the amplification circuit 90 to "stop" the timing circuit 100 upon receipt by the transducer 66 of the reflected pulse wave.

Specifically, oscillator 74 generates a carrier frequency "f". Pulse modulator 76 provides the pulsed signal which will be timed from transmission to reception by transducer 66. On the rising edge of the modulated pulse, switch 82 is moved to position "A" and timing circuit 100 is started at time $T_1$. On the failing edge of the modulated pulse, switch 82 moves to position "B" so as to be ready to receive the reflected wave pulse. The reflected pulse is received by an amplification circuit 90 for amplifying and detecting the peak amplitude. The rising edge of the final reflected pulse triggers timing circuit 100 to stop timing at time $T_2$. The timing circuit 100 is not activated again until subsequent reflected pulses due to ancillary reflections have attenuated. As a non-limiting example, a relatively low resonance frequency "f" is centered at about 2.2 MHz. The 2.2 MHz modulated signal was generated by the pulse generator 76. The modulated pulse width is approximately 1.25 microseconds and is repeated every 440 microseconds. This provided a sampling rate of approximately 2.3 KHz. It is to be understood, however, that other suitable means for measuring the time difference between emitted and reflected and echo pulses may be used.

To provide means for calculating the relative distance between the piston 44 and the base valve 52, a central electronic processor ("computer") 110 is used. The computer 110 uses the output from the timing circuit 100 to calculate the relative distance between the moveable piston 44 and the end of the cylinder 40 or the base valve 52. After the distance between the piston 44 with respect to the base valve 52 has been determined by the computer 110, the computer 110 generates an output in response to the distance calculation which can be used in various suspension control algorithms requiring relative positional distance input. One such control scheme is to deliver the distance calculation to a piston control circuit 120. The piston control circuit 120 then acts to change the damping characteristics of the piston 44 to obtain the desired road handling characteristics.

Such distance determinations can also be employed to provide positional, directional and/or force information applicable to controlling active or dynamic leveling actuators instead of, or in addition to, damping control.

In order to increase the sensitivity of the receiver circuit it is preferable that transducer 66 to be able to drive into a high impedance when it is acting as a receiver. However, the circuitry should provide low output impedance when the transducer is being driven as an emitter. Using commonly available electronics, the impedance level can be switched from low to high between the time of transmission and reception.

Referring now to FIG. 4, the transducer 66 is illustrated. Transducer 66 is mounted between a first mounting plate 130 and a second mounting plate 132. The transducer is generally centrally aligned over the base valve 52 to provide optimum reflective characteristics. Preferably the mounting plates 130 and 132 are fabricated from aluminum. Electrical connections (not shown) are made with transducer 66 on a first lower surface 134 of the piezoelectric crystal 68. A tinned copper ring 136 is soldered to the peripheral surface of the opposite top surface 138 of the crystal 68 to ensure sufficient electrical connections to first mounting plate 130. A layer of neoprene rubber 140 is used between the mounting plates 130 and 132 to electrically insulate the lower surface face of transducer 66 from the second mounting plate 132.

Preferably the electrical connections to the driving circuitry are made through a hollow central bore of rod 46 using screened cable. It is contemplated that any means for securably mounting the transducer to the end of the piston 44 which provides the requisite sensitivity is within the scope of this invention. Further, any transducer assembly providing the requisite electrical connections and alignment relative to the reflective member is suitable.

Base valve 52 is provided with a step-like upper first surface 51 and second lower surface 53. This provides known "fixed" distance reflecting surfaces for calibrating ultrasonic distance "h" measurements where changes in the speed of wave propagation is varied due to temperature and pressure changes of the damping fluid. Such a step-like base valve 52 provides two distance reflected pulses. Changes in the time between the reception of the two reflected pulses (previously referred to as the reflected and echo waves) provides a reference for "fine-tuning" the control circuit to compensate for such variation. Alternatively, a thermocouple may be positioned within the shock absorber 20 to determine temperature fluctuations. Such information would permit use of look-up tables by the central processor 110 to compensate the temperature dependence of the velocity of sound through the fluid. Also, it is contemplated that the present invention may comprise various methods, currently utilized in sonar systems, for adjusting the relative distance determination "h" to compensate for changes in the speed of wave propagation due to the temperature and viscosity of the damping medium. Such compensation can be incorporated into the computer software based on known characteristic of the damping fluid.

While it is apparent that the preferred embodiment illustrate herein is well calculated to fill the object stated above, it will be appreciated that the present invention is susceptible to modification, variation and change without departing from the scope of the invention. For example, it is contemplated that the timing circuit 100, the computer 110 and wave generating circuit 72 may all be located either internal or external with respect to the damper. If located externally of the damper 20, a single computer 110 may be used to calculate the relative distance and control any suspension parameter (leveling, damping, springing, etc.) for each of the dampers in the vehicle suspension. Likewise, it is contemplated that acoustical waves outside the ultrasonic spectrum could also be used with the present invention if suitable for the particular application.

What is claimed is:

1. A hydraulic actuator connecting the sprung and unsprung portions of a vehicle, said hydraulic actuator operable to selectively change a suspension parameter in response to changes in a relative relationship between a telescopically movable component and a stationary component of said hydraulic actuator, comprising:
   a cylinder forming a working chamber operable to store damping fluid;
   a piston disposed within said cylinder defining a first and a second portion of said working chamber, said piston being movable within said cylinder;
   transducer means for emitting and receiving sound waves propagating through damping fluid contained within said second portion of said working chamber;
   means for driving said transducer means so as to cause said transducer means to emit sound waves, said means for driving being operable to cause said transducer means to emit said sound waves in response to a first electrical signal;
   means for reflecting sound waves emitted by said transducer means, said reflecting means being disposed within said cylinder;
   timing means for determining the time between a sound wave emitted by said transducer means and reception of a reflection of said sound waves by said transducer means, said timing means generating an output in response thereto, said timing means including switch means for electrically connecting said transducer means to said means for driving upon receipt of said first electrical signal, said switch means being further operable to electrically connect said transducer means to said timing means in the absence of said first electrical signal;
   means for calculating the relative relationship between said piston within said cylinder in response to said output from said timing means; and
   a control circuit operable selectively change said suspension parameter in response to the relative relationship of said piston within said cylinder.

2. The hydraulic actuator according to claim 1, wherein said actuator is a hydraulic direct acting, telescopic, shock absorber.

3. The hydraulic actuator according to claim 1, wherein the frequency of the sound waves emitted by said first transducer means residue within the ultrasonic spectrum.

4. The hydraulic actuator according to claim 3, wherein said driving means comprises a wave generating circuit operable to cause said transducer means to generate ultrasonic waves.

5. The hydraulic actuator according to claim 4, wherein said wave generation circuit enables said transducer means to generate pulsed ultrasonic waves having a fixed controlled frequency and duration.

6. The hydraulic actuator according to claim 5 further comprising a piston rod for supporting said piston in said working chamber, said transducer means comprises a transmitter mounted to said piston on a surface opposite said piston rod and being operable to propagate ultrasonic waves through said damping fluid contained in said second portion of said working chamber.

7. The hydraulic actuator according to claim 6, wherein said transducer means also acts as a receiver.

8. The hydraulic actuator according to claim 7, wherein said transducer means comprise piezoelectric transducers.

9. The hydraulic actuator according to claim 7, wherein said transducer means comprises magnetorestrictive transducers.

10. The hydraulic actuator according to claim 1, wherein said reflecting means comprises a base valve disposed within said cylinder.

11. The hydraulic actuator according to claim 10, wherein said base valve further comprises means for compensating for changes in the speed of propagation of said sound waves.

12. The hydraulic actuator according to claim 1, wherein said reflecting means comprises a bottom end surface of said cylinder.

13. The hydraulic actuator according to claim 1, wherein said timing means comprises a timing circuit operable to continuously generate an output in response to the time between a sound wave being emitted by said transducer means and a reflection of said sound wave being received by said transducer means.

14. The hydraulic actuator according to claim 1, wherein said means for calculating the relative relationship between said piston and said cylinder comprises an electronic processor.

15. A method of determining the relative displacement between a piston and a stationary surface within a pressure cylinder of a direct acting shock absorber, said method comprising the steps of:
   delivering an electrical signal generated by a wave generation circuit to an ultrasonic transmitter through a first electrical path including at least a two-position switch when said switch is in a first position, said ultrasonic transmitter operable to emit pulsed ultrasonic waves of fixed and controlled frequency in response to said electrical signal generated by said wave generation circuit, said switch being operable to allow electric current to flow in a second electrical path when said switch is in a second position;
   changing the position of said switch from said first position to said second position so as to allow electric current to flow through said second electrical path;
   reflecting said ultrasonic waves emitted by said ultrasonic transmitter against a fixed inner surface of said pressure cylinder;
   receiving said ultrasonic wave reflected by said fixed inner surface by an ultrasonic receiver through said second electrical path;
   changing the position of said switch from said second position to said first position so as to allow electrical current to flow through said first electrical path;
   providing timing means for determining the time an emitted ultrasonic wave takes to be reflected back to said receiver, and generating an output signal in response thereto; and calculating the relative distance between said piston and said fixed inner surface in response to said output signal from said timing means.

16. The method of claim 15 further comprising the step of selectively changing a suspension parameter of said shock absorber in response to said calculated relative distance between said piston and said fixed inner surface.

17. The method of claim 16, wherein said transmitter and said receiver comprise a single piezoelectric transducer.

18. The method of claim 16, wherein said piston has a first surface facing said fixed inner surface of said pressure cylinder, said piezoelectric transducer being mounted to said first surface of said piston.

19. The method of claim 18, wherein said step of calculating said relative movement between said piston and said fixed inner surface comprises delivering said output signal from said timing circuit to a central processor, said central processor calculating said relative distance from said output.

20. A direct acting hydraulic shock absorber operable to selectively vary a suspension characteristic thereof in response to the relative displacement between a movable and a stationary component, said shock absorber comprising:
a pressure cylinder forming a working chamber operable to store damping fluid;
a piston disposed within said pressure cylinder defining a first and second portion of said working chamber, said piston being movable with respect to said pressure cylinder and comprising valve means for metering the flow of damping fluid between said first and second portions of said working chamber during movement of said piston within said pressure cylinder;
transducer means for emitting and receiving sound waves propagating through said damping fluid contained within said second portion of said working chamber, said transducer means being mounted to said piston;
means for driving said transducer means being operable to cause said transducer means to emit sound waves upon generation of a first electrical signal;
a base valve operable mounted to an end surface of said second portion of said working chamber, said base valve operable to reflect sound waves emitted by said transducer means, said base valve having means for compensating for variations in the speed of propagation of said sound waves through said damping fluid;
a timing circuit for measuring the difference in time of said sound wave emitted by said transducer means and said sound waves received by said transducer means, and generating an output in response thereto, said timing circuit including switch means for electrically connecting said transducer means to said means for driving upon receipt of said first electrical signal, said switch means being further operable to electrically connect said transducer means to said timing means in the absence of said first electrical signal;
a computer for calculating the distance between said piston and said base valve from said output of said timing circuit; and
a piston control circuit for selectively controlling said valve means so as to change the flow of damping fluid in said shock absorber in response to the distance between said piston and said base valve.

21. The direction acting hydraulic shock absorber according to claim 20, wherein said sound waves emitted by said transducer means reside within the ultrasonic spectrum.

22. The direct acting hydraulic shock absorber according to claim 21, wherein said means for driving said transducer means comprises a wave generation circuit, said wave generation circuit operable to cause said transducer means to generate constant frequency ultrasonic wave.

23. The direct acting hydraulic shock absorber according to claim 22, wherein said wave generation circuit is operable to generate at modulated pulsed signal.

24. The direct acting hydraulic shock absorber according to claim 22, wherein said transducer means comprise piezoelectric devices.

25. The direct acting hydraulic shock absorber according to claim 22, wherein said transducer means comprise magnetorestrictive devices.

26. The direct acting hydraulic shock absorber according to claim 22, wherein said frequency detection circuit continuously generates an output in response to change in distance between said piston and said base valve.

27. The direct acting hydraulic shock absorber according to claim 20, wherein said compensation means associated with said base valve comprises a step-like base valve having first and second reflecting surfaces, said first and second reflecting surfaces separated by a predetermined axial distance such that said transducer means receives two distinct sound waves reflected by said first and second reflecting surface, respectively, so as to define a reference signal.

* * * * *